US010058962B2

(12) United States Patent
Cai et al.

(10) Patent No.: US 10,058,962 B2
(45) Date of Patent: Aug. 28, 2018

(54) TWO-LAYER DISK TYPE TOOL MAGAZINE DEVICE

(71) Applicants: Greatoo Intelligent Equipment Inc., Guangdong (CN); GREATOO(GUANGZHOU) ROBOTS AND INTELLIGENT MANUFACTURING CO., LTD., Guangzhou (CN)

(72) Inventors: Guiyang Cai, Guangdong (CN); Yingjun Zhou, Guangdong (CN); Haiyu Lu, Guangdong (CN); Dehua Li, Guangdong (CN)

(73) Assignee: Greatoo Intelligent Equipment Inc., Guangdong (CN)

( * ) Notice: Subject to any disclaimer, the term of this patent is extended or adjusted under 35 U.S.C. 154(b) by 234 days.

(21) Appl. No.: 15/300,225

(22) PCT Filed: Nov. 23, 2015

(86) PCT No.: PCT/CN2015/000811
§ 371 (c)(1),
(2) Date: Sep. 28, 2016

(87) PCT Pub. No.: WO2016/106763
PCT Pub. Date: Jul. 7, 2016

(65) Prior Publication Data
US 2017/0190009 A1 Jul. 6, 2017

(30) Foreign Application Priority Data
Jan. 3, 2015 (CN) .......................... 2015 1 0004945

(51) Int. Cl.
*B23Q 3/157* (2006.01)
*B23Q 3/155* (2006.01)

(52) U.S. Cl.
CPC ..... *B23Q 3/15526* (2013.01); *B23Q 3/15539* (2016.11); *B23Q 3/15722* (2016.11);
(Continued)

(58) Field of Classification Search
CPC ............ B23Q 3/15526; B23Q 3/15539; B23Q 3/15722; Y10T 483/1882; Y10T 483/1845
See application file for complete search history.

(56) References Cited

U.S. PATENT DOCUMENTS 3,966,052 A * 6/1976 Knaus ................ B23Q 3/15526
211/129.1
4,053,968 A * 10/1977 Johnson ............. B23Q 3/15506
211/1.53
(Continued)

FOREIGN PATENT DOCUMENTS

CN 203471446 U * 3/2014
DE 3424178 A1 * 4/1985 ......... B23Q 3/15526
(Continued)

OTHER PUBLICATIONS

ISR for PCT/CN2015/000811 completed Jan. 17, 2016.

*Primary Examiner* — Daniel Howell
(74) *Attorney, Agent, or Firm* — Schmeiser, Olsen & Watts, LLP

(57) ABSTRACT

A two-layer disk type tool magazine device matched with a numerical control machine tool, comprises a tool magazine base, a tool magazine support, tool sleeve chucks, a tool disk base, tool sleeves and a tool alignment instrument. The tool magazine base is connected to and installed on the machine tool. The tool magazine support is connected to one end of the tool magazine base. The tool disk base is connected to the support by means of a bolt. The tool alignment instrument is installed at the other end of the tool magazine base. The two tool sleeve chucks are installed on the tool disk base and partitioned by a tool disk partition sleeve. The two layers (Continued)

of tool sleeve chucks clamp a tool sleeve base and are fixed by means of bolts. A tool disk pressing ring presses against the tool sleeve chuck on the upper layer.

3 Claims, 5 Drawing Sheets

(52) U.S. Cl.
CPC ............ *B23Q 2003/15527* (2016.11); *B23Q 2003/15532* (2016.11); *Y10T 483/1809* (2015.01); *Y10T 483/1845* (2015.01); *Y10T 483/1882* (2015.01)

(56) References Cited

U.S. PATENT DOCUMENTS

| | | | | |
|---|---|---|---|---|
| 4,344,221 A | * | 8/1982 | Pagani | B23Q 3/15526 483/8 |
| 4,419,807 A | * | 12/1983 | Moulin | B23Q 3/15526 408/35 |
| 4,648,171 A | * | 3/1987 | Yasukawa | B23Q 3/15526 483/1 |
| 5,222,285 A | * | 6/1993 | Horikawa | B23Q 3/15526 198/346.1 |
| 5,364,329 A | * | 11/1994 | Line | B23Q 3/15526 211/1.55 |
| 5,702,336 A | * | 12/1997 | Kameyama | B23Q 3/1554 294/106 |
| 6,228,006 B1 | * | 5/2001 | Horn | B23Q 3/15733 483/55 |
| 2011/0015050 A1 | * | 1/2011 | Hakamata | B23Q 3/15526 483/67 |

FOREIGN PATENT DOCUMENTS

| | | | | |
|---|---|---|---|---|
| EP | 2626171 A1 | * | 8/2013 | ......... B23Q 3/15526 |
| FR | 2515948 A1 | * | 5/1983 | ............... A47F 5/05 |
| JP | 2003117755 A | * | 4/2003 | |

* cited by examiner

TWO-LAYER DISK TYPE TOOL MAGAZINE DEVICE

FIELD OF THE INVENTION

The present invention relates to a part of a numerical control machine tool, and specifically, to a two-layer disk type tool magazine device matched with a numerical control machine tool.

BACKGROUND OF THE INVENTION

Numerical control machine tools are novel automatic machine tools developed in 1950s, which well solve the machining problems of complexly shaped, precision and small-batch parts, and have the advantages of good adaptability, and high machining precision and production efficiency. Integration of advanced technologies in such aspects as electronic computers, automatic control, servo drive, precision measurement and novel mechanical structures in numerical control machine tools leads to development of the numerical control machine tools with rapid changes, and stronger and stronger functions of the numerical control machine tools. The development trend of the numerical control machine tools reflects in developments in aspects such as numerical control functions, numerical control servo systems, programming methods, detecting and monitoring functions of the numerical control machine tools, automatic adjustment and control technologies, and the like.

A tool magazine device is a device intended to meet tool storing and changing requirements in the automatic machining process of a numerical control machine tool; its automatic tool changing mechanism and tool magazine capable of holding a plurality of tools cause a change to the traditional production modes in which human plays a dominative role. By means of control of computer programs, various different machining requirements such as milling, drilling, boring and tapping may be met; the machining time is greatly shortened and the production cost is reduced.

In recent years, the tool magazines have developed to transcend its role as a machine tool part; as a result, in the particular technical field, there have been developed products in accordance with such conceptions as high precision, high efficiency, high reliability and multi-work combination of the machine tools.

Current common disk type tool magazine devices are almost driven by a single-end dual-lead worm and gear; such a manner has the problems of complex structure, transmission clearance, low accuracy, and low tool installation amount, generally 8-20.

SUMMARY OF THE INVENTION

The present invention aims at providing an improved disk type tool magazine device with respect to the disadvantages of the current common disk type tool magazine devices.

The two-layer disk type tool magazine device provided by the present invention comprises a tool magazine base, tool magazine supports, tool sleeve chucks, a tool disk base and tool sleeves. The tool sleeves are used for sleeving various types of tools. The tool magazine base is connected to and installed on a machine tool by means of a bolt. One end (outside the machine tool) of the tool magazine base is hollowed out into a U shape. A pair of tool magazine supports is connected to both sides of the U shape by means of bolts. A transverse plate is arranged in a position between and above the tool magazine support. Two tool sleeve chucks are placed on the tool disk base and partitioned by a tool disk partition sleeve. The two layers of tool sleeve chucks clamp an upper-layer tool sleeve base and a lower-layer tool sleeve base and are fixed by means of bolts. Tool sleeve clamping jaws are mounted on the upper-layer tool sleeve base and the lower-layer tool sleeve base, respectively, and each tool sleeve clamping jaw is capable of clamping one tool sleeve. A tool disk pressing ring presses against the tool sleeve chuck on an upper layer, and is connected to the tool disk base by means of a long bolt after passing through the tool sleeve chuck on the upper layer, the tool disk partition sleeve and the tool sleeve chuck on a lower layer; the tool disk base is in transmission connection with a retarder and a servomotor at the bottom; the tool disk base is erected on the transverse plate by means of the retarder.

In the present invention, each tool sleeve chuck is snowflake-shaped with 28 forks at a periphery thereof. The forks are divided into a long group and a short group, each including 14 forks, and the long and short forks are alternated with each other in circumferentially uniform distribution; the forks are numbered from 1 to 28. The upper-layer tool sleeve base is installed at the odd-numbered forks of the chuck, while the lower-layer tool sleeve base is mounted at the even-numbered forks of the chuck. The tool sleeve clamping jaws are connected to the upper-layer and lower-layer tool sleeve bases by means of bolts, respectively. The tool sleeves are installed on the tool sleeve clamping jaws.

In the present invention, a tool alignment instrument is arranged on the tool magazine base. The tool alignment instrument is mounted on the tool magazine base by means of a tool alignment instrument pressing ring and a tool alignment instrument base. The tool alignment instrument base is provided with a countersunk through hole in the middle and fixed on the tool magazine base by means of a bolt. The tool alignment instrument is placed on the tool alignment instrument base. The tool alignment instrument pressing ring penetrates through the tool alignment instrument to be connected with the tool alignment instrument base and tightly compresses the tool alignment instrument.

The present invention has the following positive advantages:

1) the servomotor is adopted to be in connection with the retarder to directly drive the tool magazine to move, thereby leading to high tool storing and changing speeds, and high accuracy;

2) the two layers of tool installing clamps (jaws) are arranged in a staggered manner, which are small in size, high in tool installation amount, and capable of increasing the tool installation amount to 28;

3) the tool alignment instrument is added, which has the functions of tool alignment and tool compensation and is capable of performing breakage detection on tools;

4) the tool sleeve chucks are made of an aviation aluminum material that is low in weight and high in strength; moreover, each chuck has the thickness of only 3 mm, and has good elasticity to ensure steady tool storing and tool changing actions, thereby preventing the tool magazine from easy damage;

5) the tool sleeve chucks are made of MC nylon that is low in weight, good in elasticity and wear-resistant; the tool sleeve chucks are injection-molded at a time, and are in tight fit with tools, and firm in clamping.

The two-layer disk type tool device provided by the present invention is low in overall weight, and compact and reasonable in structure, and has advantages such as good structural rigidity, large tool holding capability, quick tool storage and changing, high accuracy, low running noise, convenience in installation and maintenance.

BRIEF DESCRIPTION OF THE DRAWINGS

FIG. 1 to FIG. 5 are structural schematic diagrams of an embodiment of the present invention, in which
FIG. 1 is a plan view;
FIG. 2 is a top view;
FIG. 3 is a left view;
FIG. 4 is a stereoscopic view;
FIG. 5 is an exploded view.

In all the drawings, 01 Tool disk pressing ring; 02 Tool sleeve chuck; 03 Tool disk partition sleeve; 04 Upper-layer tool sleeve base; 05 Lower-layer tool sleeve base; 06 Tool disk base; 07 Tool sleeve; 08 Tool sleeve clamping jaw; 09 Tool magazine support; 10 Retarder; 11 Servomotor; 12 Tool alignment instrument; 13 Tool alignment instrument pressing ring; 14 Tool alignment instrument base; 15 Tool magazine base; 16 Transverse plate

DETAILED DESCRIPTION OF THE EMBODIMENTS

Figure 1:
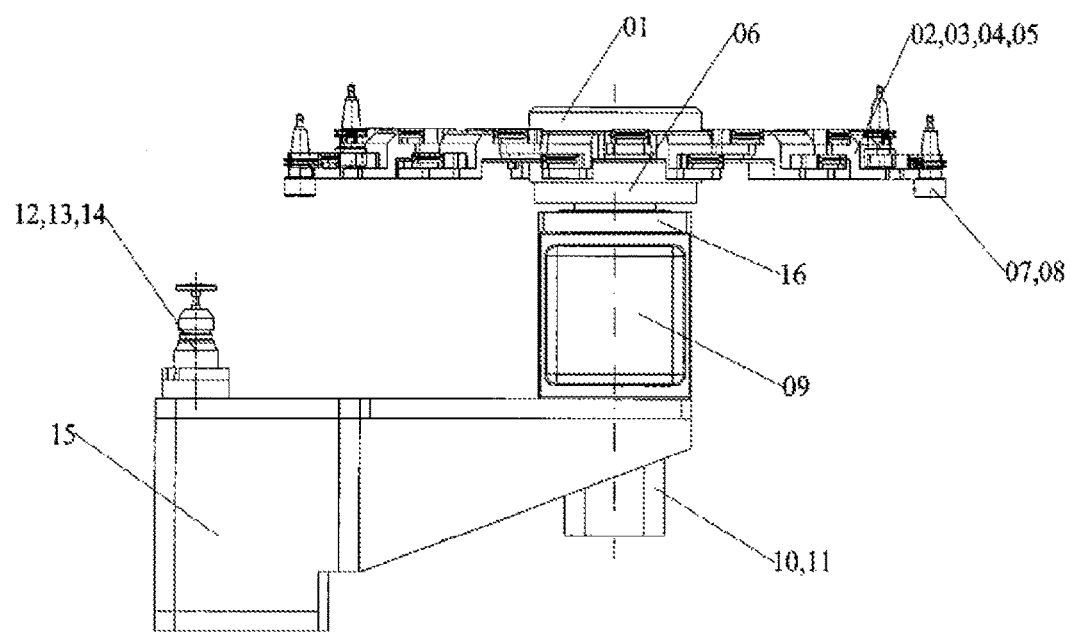
Figure 2:
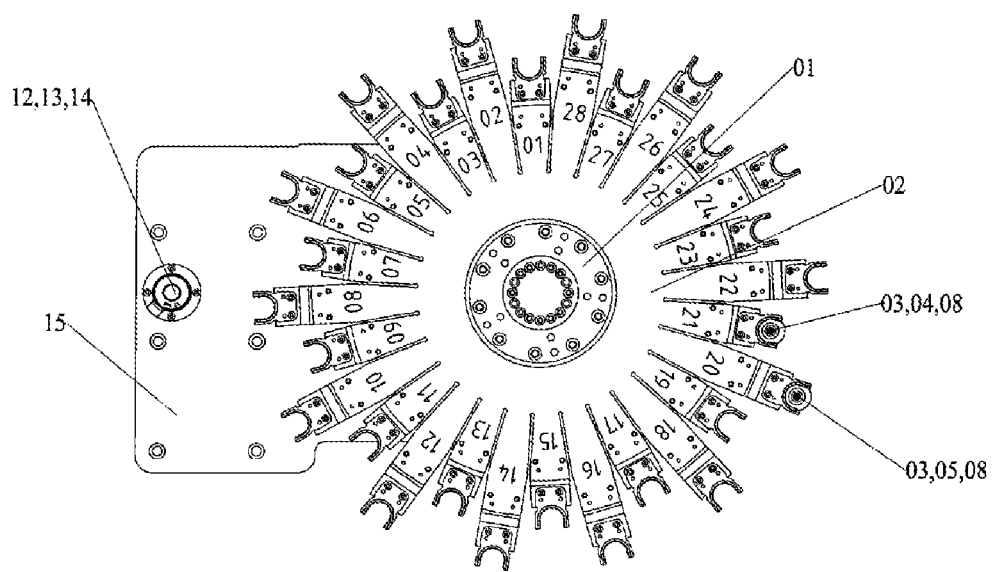
Figure 3:
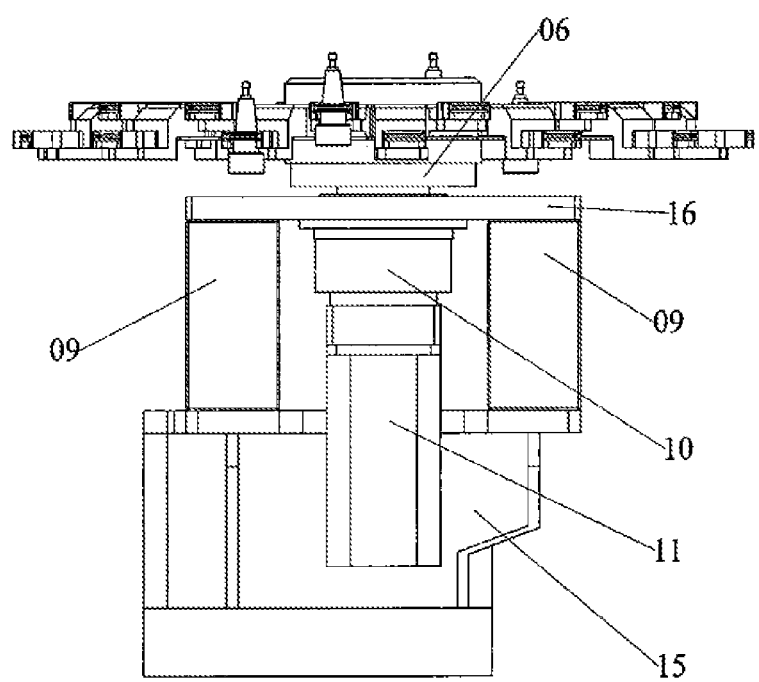
Figure 4:
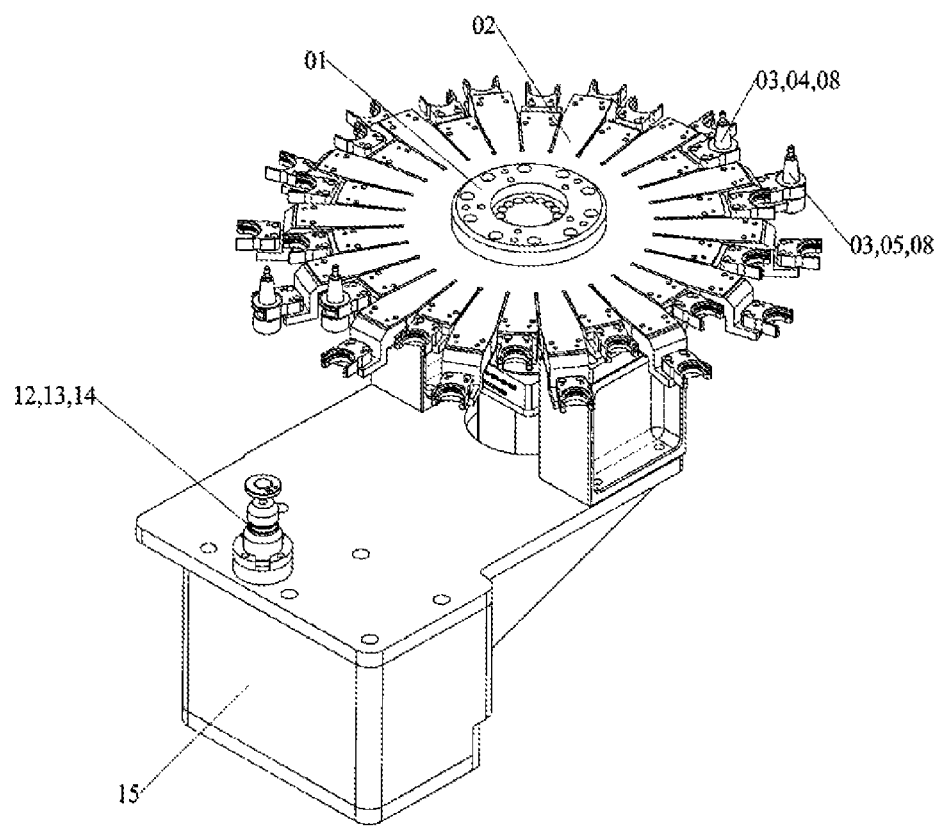
Figure 5:
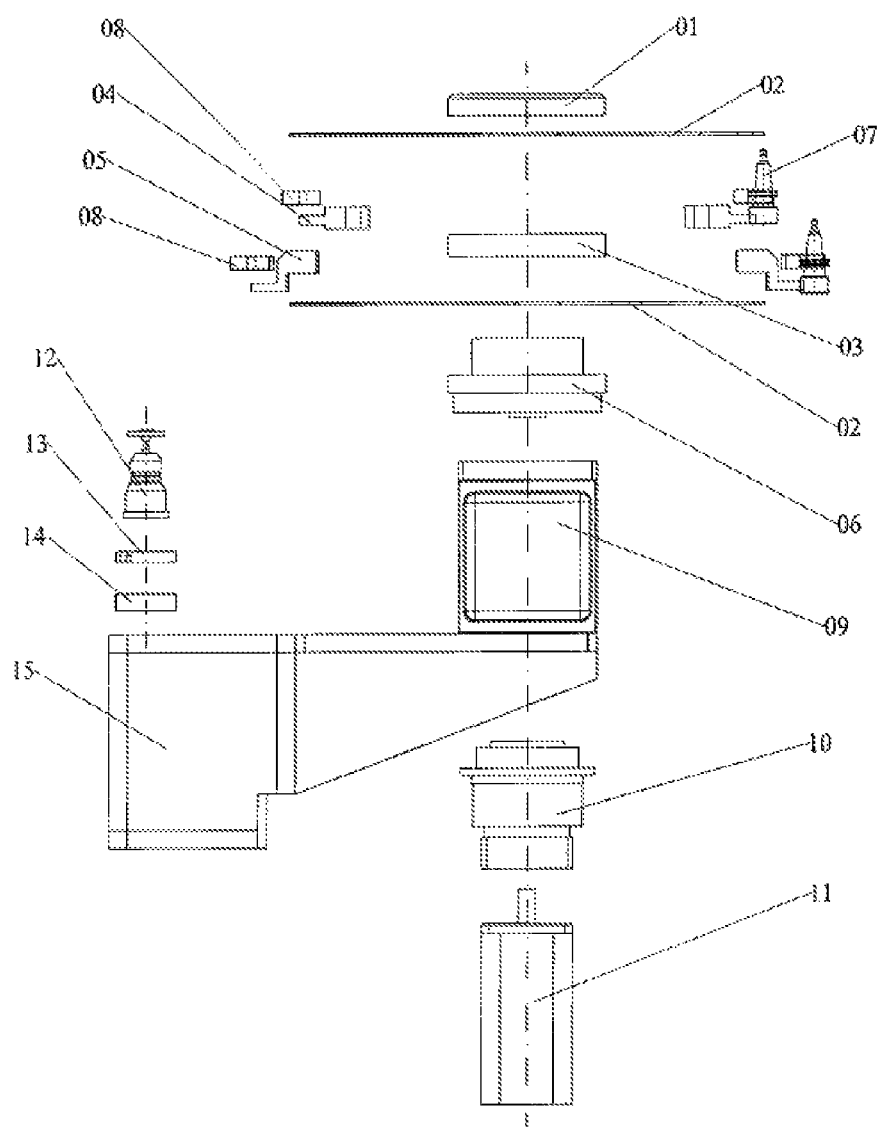

Referring to FIG. 1 to FIG. 5, a two-layer disk type tool magazine device matched with a numerical control machine tool comprises a tool magazine base 15, tool magazine supports 09, tool sleeve chucks 02, a tool disk base 06, tool sleeves 07. The tool sleeves 07 are used for sleeving various types of tools. The tool magazine base 15 is connected to and installed on the machine tool (not shown in the figures) by means of a bolt. One end (outside the machine tool) of the tool magazine base 15 is hollowed out into a U shape. A pair of tool magazine supports 09 is connected to both sides of the U shape by means of bolts. A transverse plate 16 is arranged in a position between and above the tool magazine supports 09. Two tool sleeve chucks 02 are placed on the tool disk base 06 and partitioned by a tool disk partition sleeve 03. The two layers of tool sleeve chucks 02 clamp an upper-layer tool sleeve base 04 and a lower-layer tool sleeve base 05 and are fixed by means of bolts. Tool sleeve clamping jaws 08 are mounted on the upper-layer tool sleeve base 04 and the lower-layer tool sleeve base 05, respectively, and each tool sleeve clamping jaw 08 is capable of clamping one tool sleeve 07. A tool disk pressing ring 01 presses against the tool sleeve chuck 02 on an upper layer, and is connected to the tool disk base 06 by means of a long bolt after passing through the tool sleeve chuck 02 on the upper layer, the tool disk partition sleeve 03 and the tool sleeve chuck 02 on a lower layer. The tool disk base 06 is in transmission connection with a retarder 10 and a servomotor 11 at the bottom. The tool disk base 06 is erected on the transverse plate 16 by means of the retarder 10.

In the present embodiment, each tool sleeve chuck 02 is snowflake-shaped with 28 forks at a periphery thereof. The forks are divided into a long group and a short group, each including 14 forks, and the long and short forks are alternated with each other in circumferentially uniform distribution; the forks are numbered from 1 to 28. The upper-layer tool sleeve base 04 is installed at the odd-numbered forks of the chuck, while the lower-layer tool sleeve base 05 is mounted at the even-numbered forks of the chuck. The tool sleeve clamping jaws 08 are connected to the upper-layer and lower-layer tool sleeve bases by means of bolts, respectively. The tool sleeves 07 are installed on the tool sleeve clamping jaws 08.

In the present embodiment, a tool alignment instrument 12 is arranged on the tool magazine base 15. The tool alignment instrument 12 is mounted on the tool magazine base 15 by means of a tool alignment instrument pressing ring 13 and a tool alignment instrument base 14. The tool alignment instrument base 14 is provided with a countersunk through hole in the middle and fixed on the tool magazine base 15 by means of a bolt. The tool alignment instrument 12 is placed on the tool alignment instrument base 14. The tool alignment instrument pressing ring 13 penetrates through the tool alignment instrument 12 to be connected with the tool alignment instrument base 14 and tightly compresses the tool alignment instrument 12.

The two-layer disk type tool magazine device provided by the present invention works by following the following principle: the tool storing and changing actions of the tool magazine are set by a numerical control program, driven by the servomotor, and completely executed by the tool magazine in linkage with the electric spindle of the machine tool. Tool storage: in accordance with the set tool storage procedures, the tool magazine rotates to corresponding positions according to tool storage codes. The electric spindle enters the area of the tool magazine by carrying the tool sleeves (including the tools), descends, and translates the tool sleeves for feeding into the tool sleeve clamping jaws where the tool sleeves may be clamped. Next, the tool pulling oil cylinder of the electric spindle brakes to release the tool sleeves, and then ascends and returns, and the tool storage action thus is finished. Tool changing: in accordance with the set tool changing procedures, the tool sleeve (including the tool) carried on the electric spindle is fed into the tool magazine first by the same action with that in tool storage. The tool magazine then rotates to the desired tool position, and the electric spindle enters the area of the tool magazine again, runs to be above the tool sleeve, and descends; next, the tool pulling oil cylinder is started to adsorb the tool sleeve on the head of the spindle, and then the electric spindle ascends and returns, and the tool changing action thus is finished. Finally, after the electric spindle moves the carried tool to the tool alignment instrument for tool alignment, machining can be started.

What is claimed is:
1. A two-layer disk type tool magazine device, comprising a tool magazine base (15), tool magazine supports (09), tool sleeve chucks (02), a tool disk base (06), tool sleeves (07), wherein the tool sleeves (07) are used for sleeving various types of tools; the tool magazine base (15) is connected to and installed on a machine tool by means of a bolt; one end of the tool magazine base (15) is hollowed out into a U shape; a pair of tool magazine supports (09) is connected to both sides of the U shape by means of bolts; a transverse plate (16) is arranged in a position between and above the tool magazine supports (09); two tool sleeve chucks (02) are placed on the tool disk base (06) and partitioned by a tool disk partition sleeve (03); the two layers of tool sleeve chucks (02) clamp an upper-layer tool sleeve base (04) and a lower-layer tool sleeve base (05) and are fixed by means of bolts; tool sleeve clamping jaws (08) are mounted on the upper-layer tool sleeve base (04) and the lower-layer tool sleeve base (05), respectively, and each tool sleeve clamping jaw (08) is capable of clamping one tool sleeve (07); a tool disk pressing ring (01) presses against the tool sleeve chuck (02) on an upper layer, and is connected to the tool disk base (06) by means of a long bolt after passing through the tool sleeve chuck (02) on the upper layer, the tool disk partition sleeve (03) and the tool sleeve chuck (02) on a lower layer; the tool disk base (06) is in transmission connection with a retarder (10) and a servomotor (11) at the bottom; the tool disk base (06) is erected on the transverse plate (16) by means of the retarder (10).

2. The two-layer disk type tool magazine device of claim 1, wherein each tool sleeve chuck (02) is snowflake-shaped with 28 forks at a periphery thereof; the forks are divided into a long group and a short group, each including 14 forks, and the long and short forks are alternated with each other in circumferentially uniform distribution; the forks are numbered from 1 to 28; the upper-layer tool sleeve base (04) is installed at the odd-numbered forks of the chuck, while the lower-layer tool sleeve base (05) is mounted at the even-numbered forks of the chuck; the tool sleeve clamping jaws (08) are connected to the upper-layer and lower-layer tool sleeve bases by means of bolts, respectively; the tool sleeves (07) are installed on the tool sleeve clamping jaws (08).

3. The two-layer disk type tool magazine device of claim 1 or 2, wherein a tool alignment instrument (12) is arranged on the tool magazine base (15); the tool alignment instrument (12) is mounted on the tool magazine base (15) by means of a tool alignment instrument pressing ring (13) and a tool alignment instrument base (14); the tool alignment instrument base (14) is provided with a countersunk through hole in the middle and fixed on the tool magazine base (15) by means of a bolt; the tool alignment instrument (12) is placed on the tool alignment instrument base (14); the tool alignment instrument pressing ring (13) penetrates through the tool alignment instrument (12) to be connected with the tool alignment instrument base (14) and tightly compresses the tool alignment instrument (12).

\* \* \* \* \*